(12) United States Patent
Saito

(10) Patent No.: US 6,411,731 B1
(45) Date of Patent: Jun. 25, 2002

(54) TEMPLATE-BASED IMAGE RECOGNITION AND EXTRACTION

(75) Inventor: Kazuyuki Saito, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/221,840

(22) Filed: Dec. 29, 1998

(30) Foreign Application Priority Data

Jan. 9, 1998 (JP) .......................................... 10-003396

(51) Int. Cl.[7] ................................................ G06K 9/34
(52) U.S. Cl. ...................... 382/173; 382/176; 382/217; 358/453; 358/462
(58) Field of Search ............................... 382/173, 175, 382/176, 180, 217, 218, 219; 358/453, 462

(56) References Cited

U.S. PATENT DOCUMENTS

| 4,750,044 A | | 6/1988 | Nakajima ................... 358/280 |
| 5,774,579 A | * | 6/1998 | Wang et al. ................. 382/176 |
| 5,852,676 A | * | 12/1998 | Lazar ......................... 382/173 |
| 5,892,843 A | * | 4/1999 | Zhou et al. .................. 382/176 |
| 6,002,798 A | * | 12/1999 | Palmer et al. ............... 382/176 |
| 6,072,941 A | * | 6/2000 | Suzuki et al. ............... 358/462 |

FOREIGN PATENT DOCUMENTS

| EP | 0 442 054 | 8/1991 |
| EP | 0 712 088 | 5/1996 |
| GB | 2 161 042 | 1/1986 |

* cited by examiner

*Primary Examiner*—Thomas D. Lee
(74) *Attorney, Agent, or Firm*—Fitzpatrick, Cella, Harper & Scinto

(57) ABSTRACT

Position, size and attribute regarding one or a plurality of areas in an image are held as template information. Block areas such as text areas and figure areas are extracted from a document image that has entered from a scanner and an attribute is added to each block area. A block area that at least partially overlaps an area indicated by the template information and whose attribute agrees with the attribute included in the template information is acquired as extracted information from the block areas that have been extracted. This makes it possible to reliably extract a desired area from an entered document image while employing a template.

17 Claims, 19 Drawing Sheets

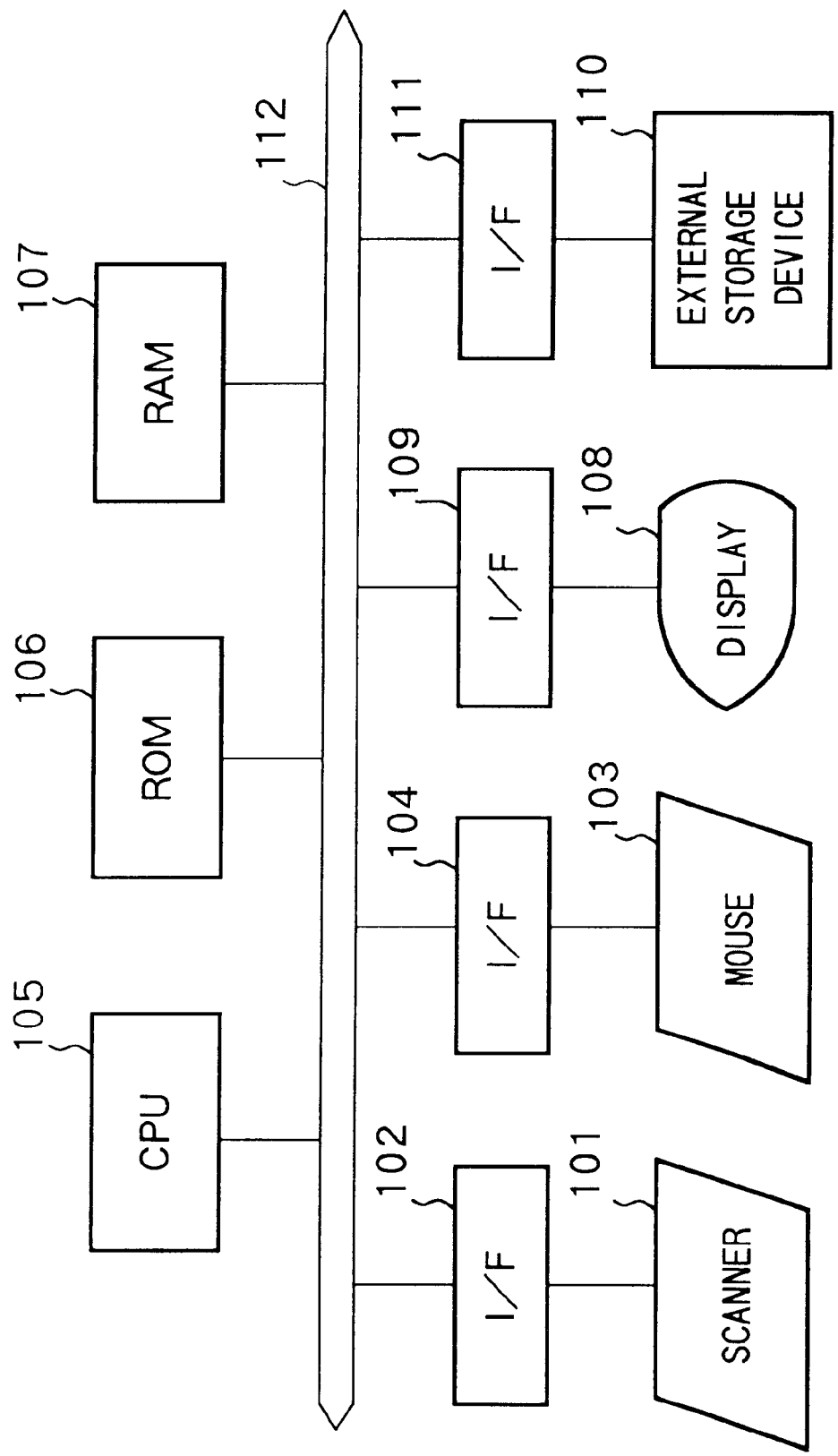

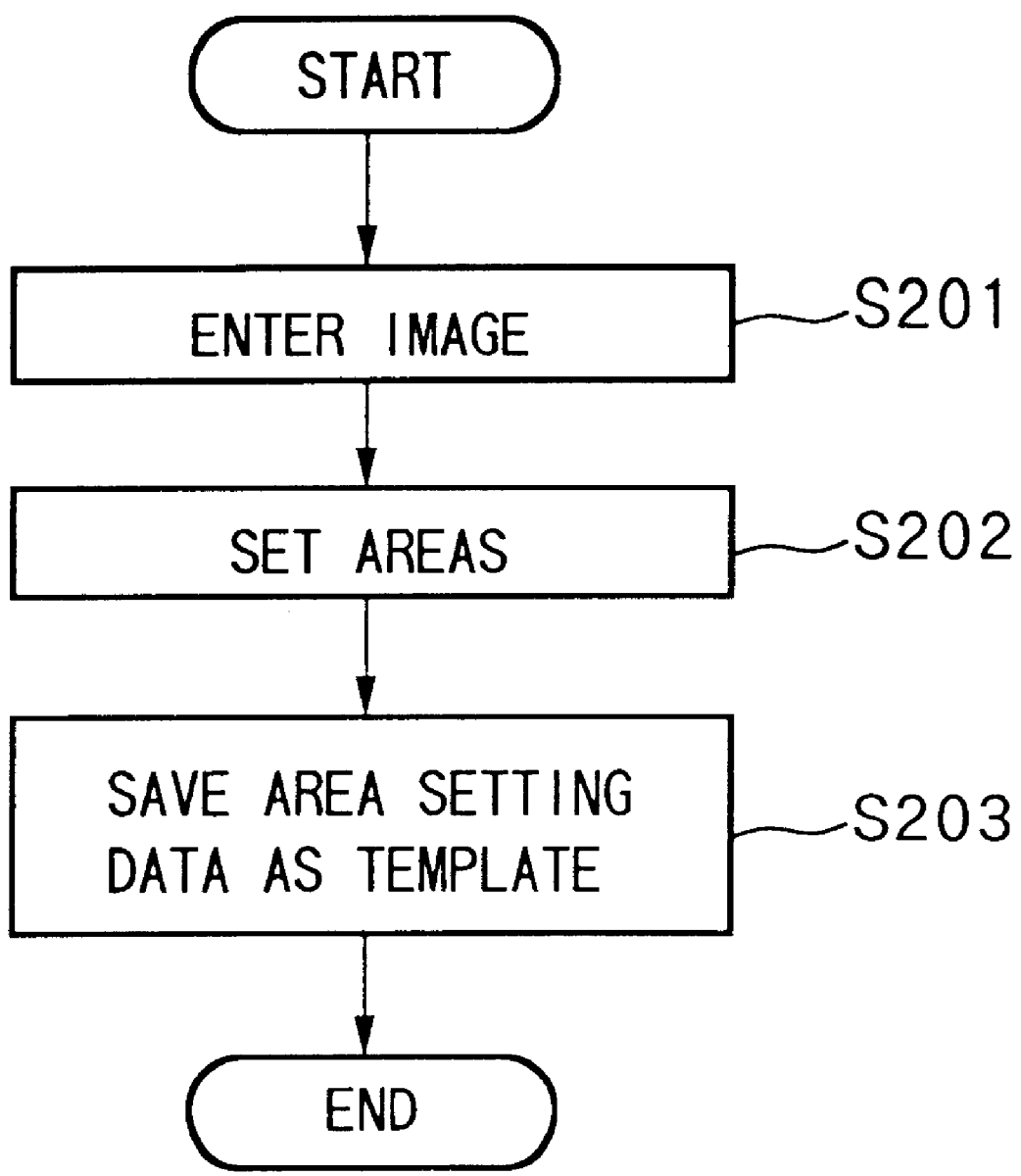

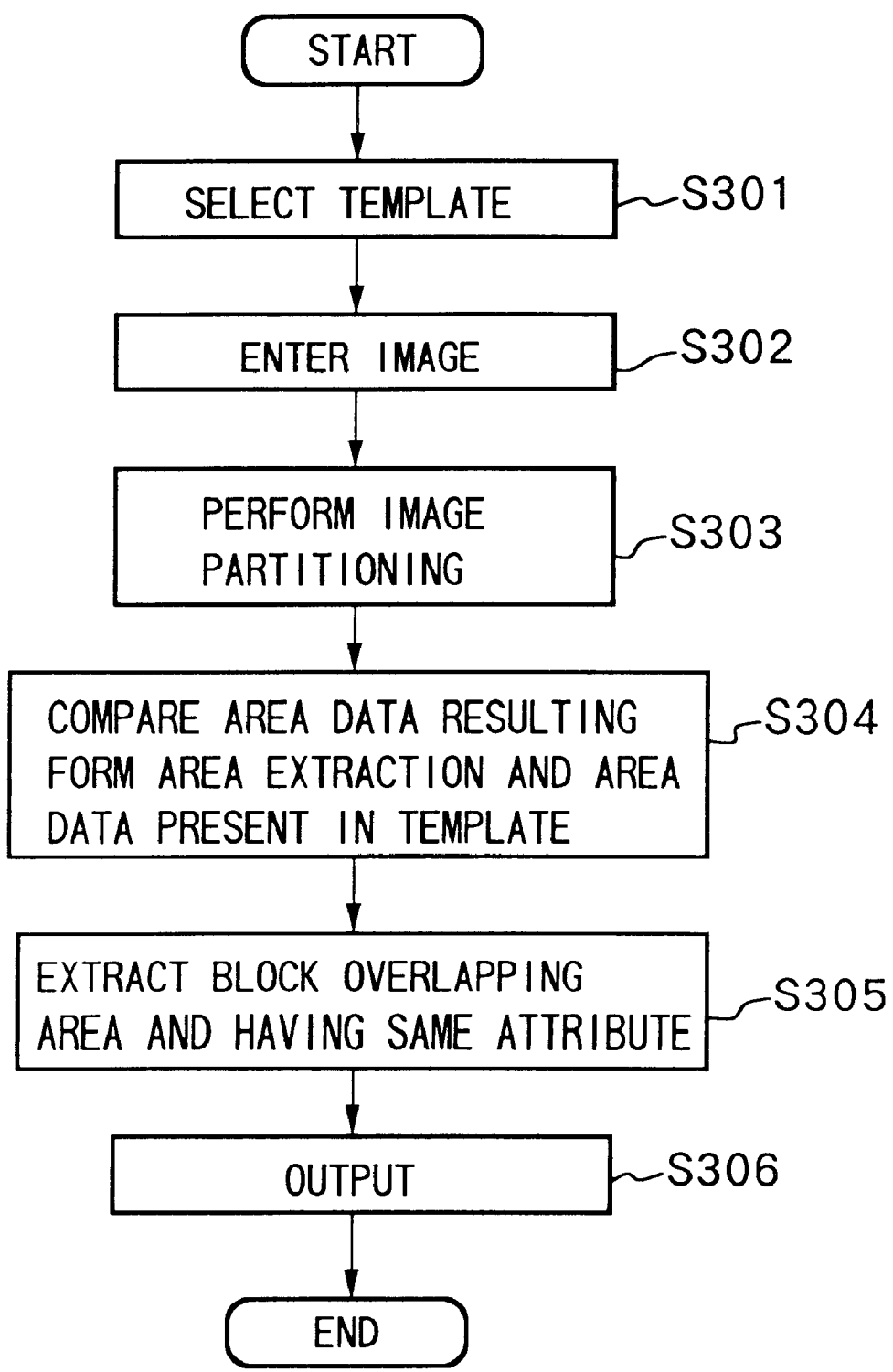

FIG.4

DOCUMENT A

第一章
手段によって得られた装置におい
て、分類して入力して手段である事
を特徴とする。得られた装置が重な
れば、分類して入力して手段である
事を特徴とする。手段によって得ら
れた装置において、分類して入力し
て手段である事を特徴とする。得ら
れた装置が重なれば、分類して入力
して手段である事を特徴とする。手
段によって得られた装置において、
分類して入力して手段である事を特
徴とする。得られた装置が重なれ
ば、分類して入力して手段である事
を特徴とする。

第二章
手段によって得られた装置
において、分類して入力し
て手段である事を特徴とす
る。得られた装置が重なれ
ば、分類して入力して手段
である事を特徴とする。手
段によって得られた装置に
おいて、分類して入力して
手段である事を特徴とす
る。得られた装置が重なれ
ば、分類して入力して手段
である事を特徴とする。手
段によって得られた装置に
おいて、分類して入力して
手段である事を特徴とす
る。得られた装置が重なれ
ば、分類して入力して手段
である事を特徴とする。

|  | data1 | data2 |
|---|---|---|
| 東京 | 1000 | 52.3 |
| 大阪 | 700 | 68.4 |
| 千葉 | 500 | 43.8 |
| 神奈川 | 500 | 28.8 |

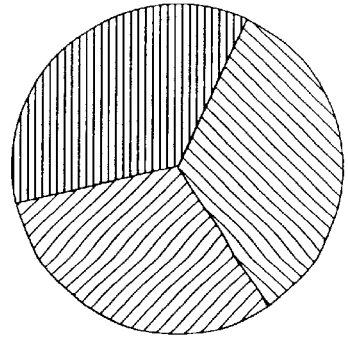

第三章
手段によって得られた装置において、分類して入力して手段である事を特徴とする。
得られた装置が重なれば、分類して入力して手段である事を特徴とする。手段によっ
て得られた装置において、分類して入力して手段である事を特徴とする。得られた装
置が重なれば、分類して入力して手段である事を特徴とする。手段によって得られた
装置において、分類して入力して手段である事を特徴とする。得られた装置が重なれ
ば、分類して入力して手段である事を特徴とする。

| IDENTIFICATION NO. OF EACH ATTRIBUTE | |
|---|---|
| TEXT | 1 |
| TITLE | 2 |
| TABLE | 3 |
| FIGURE | 4 |

FIG.7

| REGISTERED TEMPLATE | |
|---|---|
| 1 | X TEMPLATE |
| 2 | Y TEMPLATE |
| 3 | Z TEMPLATE |
| 4 | |
| 5 | |

NEWLY REGISTERED: | DOCUMENT A TEMPLATE |

FIG.9

DOCUMENT B

第四.章
手段によって得られた装置におい
て、分類して入力して手段である事
を特徴とする。得られた装置が重な
れば、分類して入力して手段である
事を特徴とする。手段によって得ら
れた装置において、分類して入力し
て手段である事を特徴とする。得ら
れた装置が重なれば、分類して入力
して手段である事を特徴とする。手
段によって得られた装置において、
分類して入力して手段である事を特
徴とする。得られた装置が重なれ
ば、分類して入力して手段である事
を特徴とする。

第五章
手段によって得られた装置
において、分類して入力し
て手段である事を特徴とす
る。得られた装置が重なれ
ば、分類して入力して手段
である事を特徴とする。手
段によって得られた装置に
おいて、分類して入力して
手段である事を特徴とす
る。得られた装置が重なれ
ば、分類して入力して手段
である事を特徴とする。手
段によって得られた装置に
おいて、分類して入力して
手段である事を特徴とす
る。得られた装置が重なれ
ば、分類して入力して手段
である事を特徴とする。

|  | data1 | data2 |
|---|---|---|
| 埼玉 | 1000 | 52.3 |
| 茨城 | 700 | 68.4 |
| 山梨 | 500 | 43.8 |
| 京都 | 500 | 28.8 |

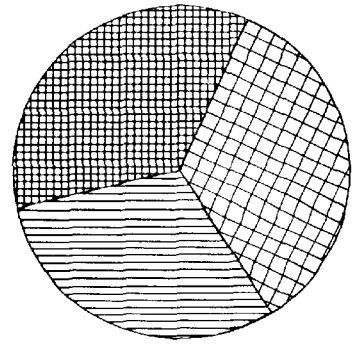

DOCUMENT B (TEXT) BLOCK A

第四章
手段によって得られた装置におい
て、分類して入力して手段である事
を特徴とする。得られた装置が重な
れば、分類して入力して手段である
事を特徴とする。手段によって得ら
れた装置において、分類して入力し
て手段である事を特徴とする。得ら
れた装置が重なれば、分類して入力
して手段である事を特徴とする。手
段によって得られた装置において、
分類して入力して手段である事を特
徴とする。得られた装置が重なれ
ば、分類して入力して手段である事
を特徴とする。

(TEXT) BLOCK B

第五章
手段によって得られた装置
において、分類して入力し
て手段である事を特徴とす
る。得られた装置が重なれ
ば、分類して入力して手段
である事を特徴とする。手
段によって得られた装置に
おいて、分類して入力して
手段である事を特徴とす
る。得られた装置が重なれ
ば、分類して入力して手段
である事を特徴とする。手
段によって得られた装置に
おいて、分類して入力して
手段である事を特徴とす
る。得られた装置が重なれ
ば、分類して入力して手段
である事を特徴とする。

| | data1 | data2 |
|---|---|---|
| 埼玉 | 1000 | 52.3 |
| 茨城 | 700 | 68.4 |
| 山梨 | 500 | 43.8 |
| 京都 | 500 | 28.8 |

BLOCK C (TABLE)

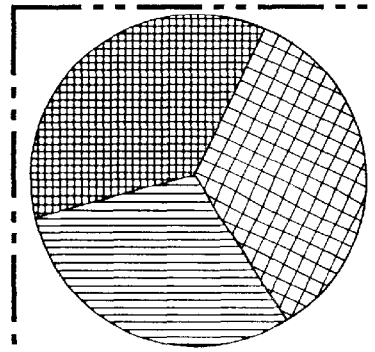

BLOCK D (FIGURE)

第六章
手段によって得られた装置において、分類して入力して手段である事を特徴とする。
得られた装置が重なれば、分類して入力して手段である事を特徴とする。手段によっ
て得られた装置において、分類して入力して手段である事を特徴とする。得られた装
置が重なれば、分類して入力して手段である事を特徴とする。手段によって得られた
装置において、分類して入力して手段である事を特徴とする。得られた装置が重なれ
ば、分類して入力して手段である事を特徴とする。

BLOCK E (TEXT)

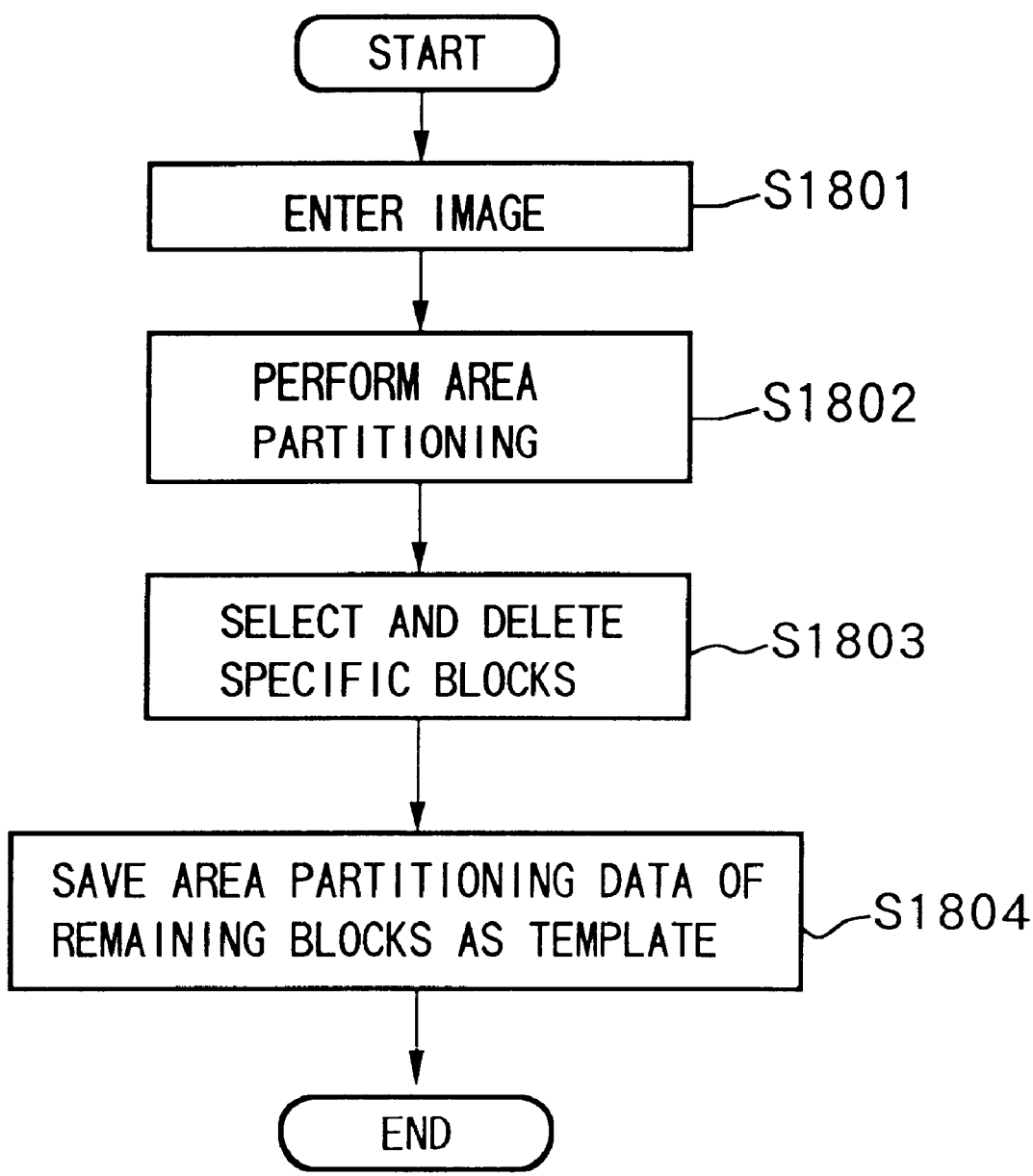

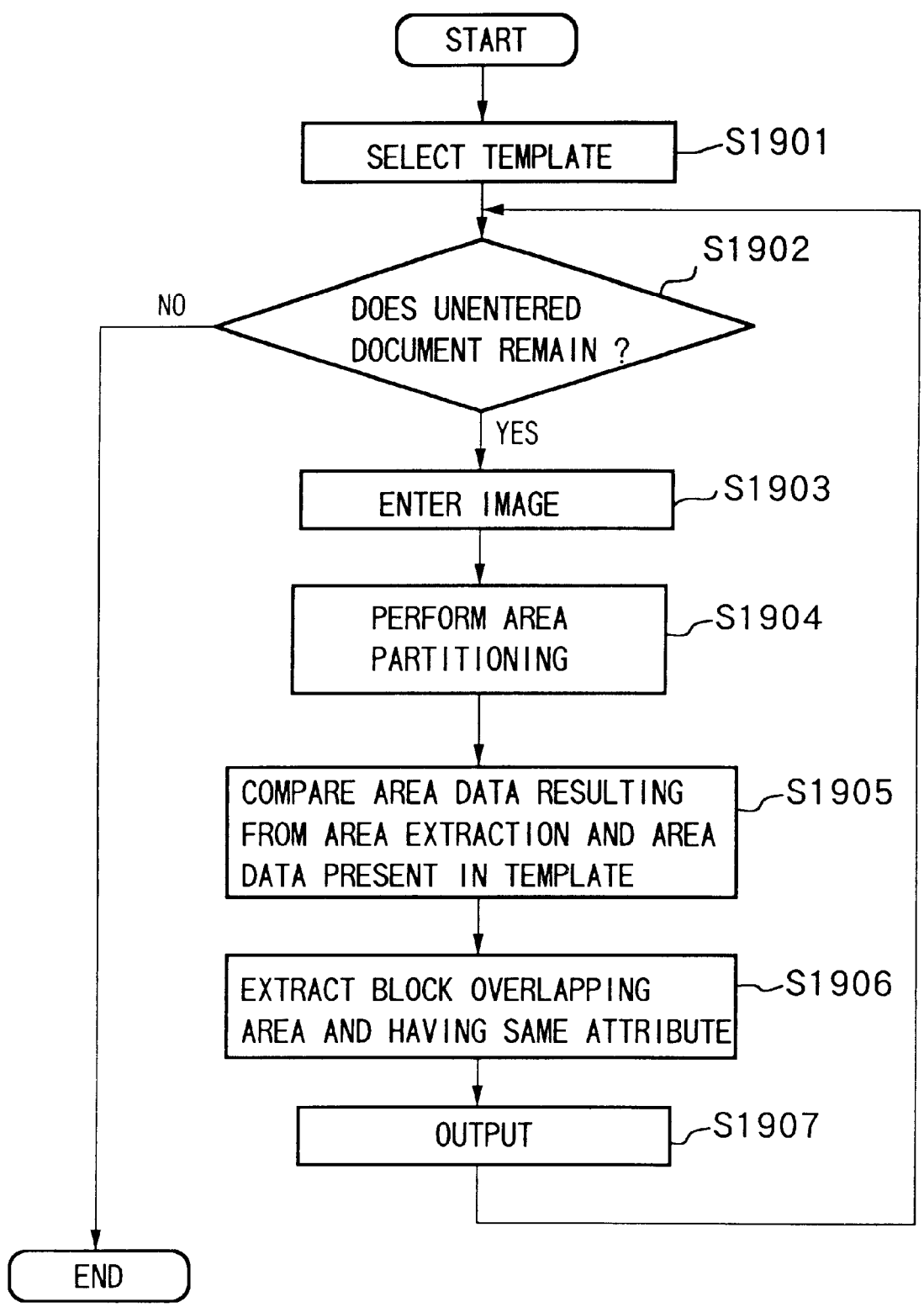

TEMPLATE-BASED IMAGE RECOGNITION AND EXTRACTION

BACKGROUND OF THE INVENTION

This invention is applicable to electronic equipment such as an OCR (optical character reader), copier, facsimile machine or processor for implementing an electronic database and, more particularly, relates to an image processing apparatus and method for extracting a specific desired area from a document image.

Two methods of extracting a desired area from a document are available. The first method is such that whenever the operator wishes to extract a desired area, the operator designates this area in an input image each time. This method involves reading the document image using a scanner, displaying the scanned image on a display monitor and having the operator designate the desired area using a mouse or the like.

The second method involves creating a template for which size and position information representing rectanglar areas has been decided in advance, applying the rectangular areas decided by the template directly to an input image and then extracting these areas from the input image. In this case rectangular areas whose positions and sizes have been decided by the template are extracted from a scanned document image and the operator need no longer perform the laborious task of specifying extraction areas one after another.

The first method is disadvantageous in that the operator must specify the desired area each time. This method, therefore, is not suited to the processing of a large number of documents. The second method using the template is disadvantages in that if there is a disparity in position or size between an area to be extracted from the input image and the rectangular area decided by the template, the area to be extracted may be omitted in the extraction process.

SUMMARY OF THE INVENTION

The present invention has been devised in view of the foregoing problems and its object is to provide an image processing apparatus and method whereby it is possible to extract a desired area from a document image in reliable fashion.

Another object of the present invention is to make possible the rapid and reliable extraction of a desired area from a large quantity of document images.

A further object of the present invention is to provide an image processing apparatus and method whereby it is possible to reliably extract a desired area from an entered document image while employing a template.

An image processing apparatus according to one mode of the present invention for attaining the foregoing objects comprises: holding means for holding position, size and attribute as template information in regard to one or a plurality of areas in an image; image input means for inputting a document image; first extraction means for extracting block areas from the document image input by the image input means and evaluating attributes of the extracted block areas; and second extraction means for extracting, from block areas that have been extracted by the first extraction means, a block area that at least partially overlaps an area indicated by the template information and whose attribute agrees with the attribute included in the template information.

An image processing method according to another mode of the present invention for attaining the foregoing objects comprises: a holding step of holding position, size and attribute as template information in regard to one or a plurality of areas in an image; an image input step of inputting a document image; a first extraction step of extracting block areas from the document image input at the image input step and evaluating attribute of the extracted block areas; and a second extraction step of extracting, from block areas that have been extracted at said first extraction step, a block area that at least partially overlaps an area indicated by the template information and whose attribute agrees with the attribute included in the template information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram illustrating the construction of an image processing apparatus according to a first embodiment of the present invention;

FIG. 2 is a flowchart for describing the procedure of template save processing according to the first embodiment;

FIG. 3 is a flowchart for describing the procedure of area extraction processing according to the first embodiment;

FIG. 4 is a diagram showing an example of a document (document A) read in for the purpose of generating template data;

FIG. 7 is a diagram for describing the registered state of template data;

FIG. 9 is a diagram showing a document B, which is an example of a document to be processed;

FIG. 10 is a diagram showing an example of results obtained by executing area partitioning processing in regard to the document B of FIG. 9;

FIG. 18 is a flowchart illustrating the procedure of template save processing according to a fourth embodiment of the present invention; and FIG. 19 is a flowchart for describing the procedure of area extraction processing according to a fifth embodiment of the present invention.

DESCRIPTION OF THE PREFERRED EMBODIMENTS

Figure 5:
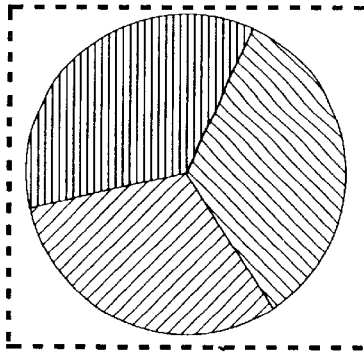
FIG. 5 is a diagram showing an example of the display of a screen for setting areas in template save processing according to the first embodiment.

Preferred embodiments of the present invention will now be described in detail in accordance with the accompanying drawings.

[First Embodiment]

FIG. 1 is a block diagram illustrating the construction of an image processing apparatus according to a first embodiment of the present invention. The apparatus includes a scanner 101 for irradiating a document having an image, reading the reflected light and converting the reflected light to an electric signal; a scanner interface 102 for converting the electric signal obtained by the scanner 101 to a binary digital signal and sending this signal to other components; a pointing device 103 (since a mouse is used in this embodiment, the device will be referred to as a mouse below) for entering desired coordinates on the window of a display; an interface circuit 104 for receiving a signal from the mouse 103 and transmitting the signal to other components; a CPU 105 for executing overall control of the apparatus and processing such as area partitioning; a ROM 106 storing programs, which are executed by the CPU 105, for various control operations and for various processing, as well as font data; a RAM 107 used as a working area for expanding a document image and for area partitioning processing; a display 108 for displaying input images and the like, wherein an image displayed is stored in a VRAM area created by a prescribed address area in the RAM 107; an external storage device 110 such as a hard disk in which data and the like is stored; and an interface 111 for the external storage device 110. These components are interconnected by a bus 112.

The flow of processing according to the first embodiment will now be described in accordance with the flowcharts of FIGS. 2 and 3. FIG. 2 is a flowchart useful in describing the procedure of processing for saving a template according to the first embodiment, and FIG. 3 is a flowchart useful in describing the procedure of processing for extracting an area according to the first embodiment.

Processing for saving a template used in area extraction will be described first with reference to FIG. 2. A document A of the kind shown in FIG. 4 having a format desired to be saved is read and converted to binary image data by a scanner 101 at step S201. Next, at step S201, small areas (referred to simply as "areas" or "blocks" below) having attributes such as "text", "table" and "figure" are set on the input image obtained.

According to this embodiment, the document A of FIG. 4 is read by the scanner and the read image is displayed on the display 108. FIG. 5 is a diagram showing the display of a screen for setting areas in template save processing according to the first embodiment. An attribute menu 51 is displayed together with the image of document A on the display 108. The operator uses the mouse 103 to select a desired attribute from the attribute menu 51 and to designate frames indicative of rectangular areas. By thus causing the frames of selected attributes to be displayed at desired positions, attributes are set in regard to each rectangular area. When a desired attribute is selected from the attribute menu 51, the color of the border of the rectangular frame displayed by operating the mouse 103 is set to a color that is associated with the selected attribute. In FIG. 5, the border color of a rectangular frame 501 is black, which indicates that the attribute of this area is "text". The border color of a rectangular frame 502 is red, which indicates that the attribute of this area is "table". The border color of a rectangular frame 504 is yellow, which indicates that the attribute of this area is "figure".

Figures 6A, 6B:
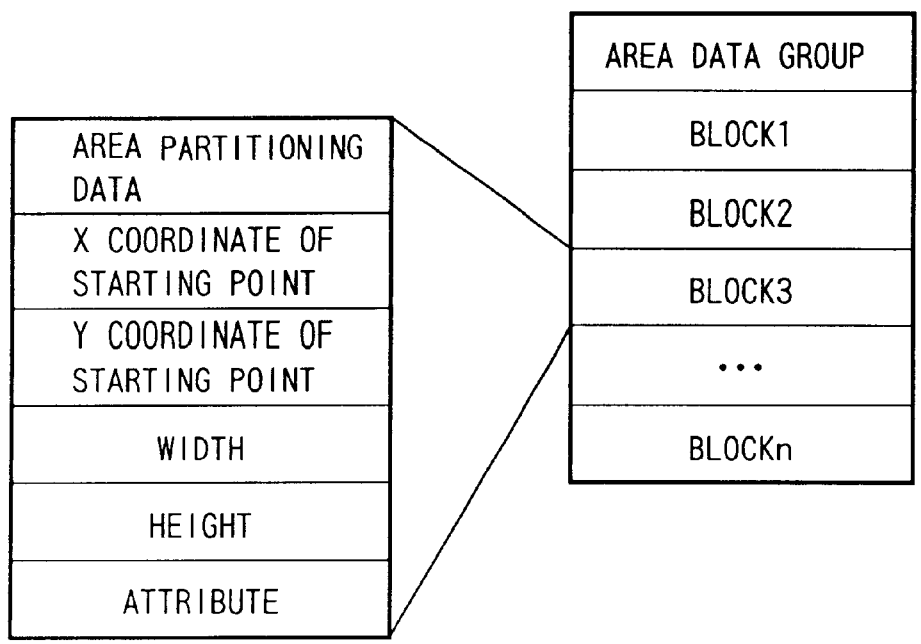
FIGS. 6A, 6B are diagrams useful in describing the data structure of template data generated by designation of areas and setting of attributes.

FIGS. 6A, 6B are diagrams useful in describing the data structure of template data generated by designation of areas and setting of attributes. Area data is stored on an area-by-area (block-by-block) basis in the manner shown in FIG. 6A. The area data is obtained by registering starting-point coordinates X, Y, width and height of the area (namely position information indicative of the rectangular frame displayed by operating the mouse), and includes an "attribute" field in which an identification number corresponding to the attribute set for the above-mentioned rectangular frame is set. Each attribute and its identification number are as shown in FIG. 6B. It should be noted that the X, Y coordinates of the starting point represent the upper left corner of the particular area.

Next, at step S203, the assemblage of area data of each of the blocks set in the manner described above is registered and saved as a template. For example, FIG. 7 shows an example in which a template is registered anew under the title "Document A Template" as the fourth of a group of already existing templates.

Figure 8:
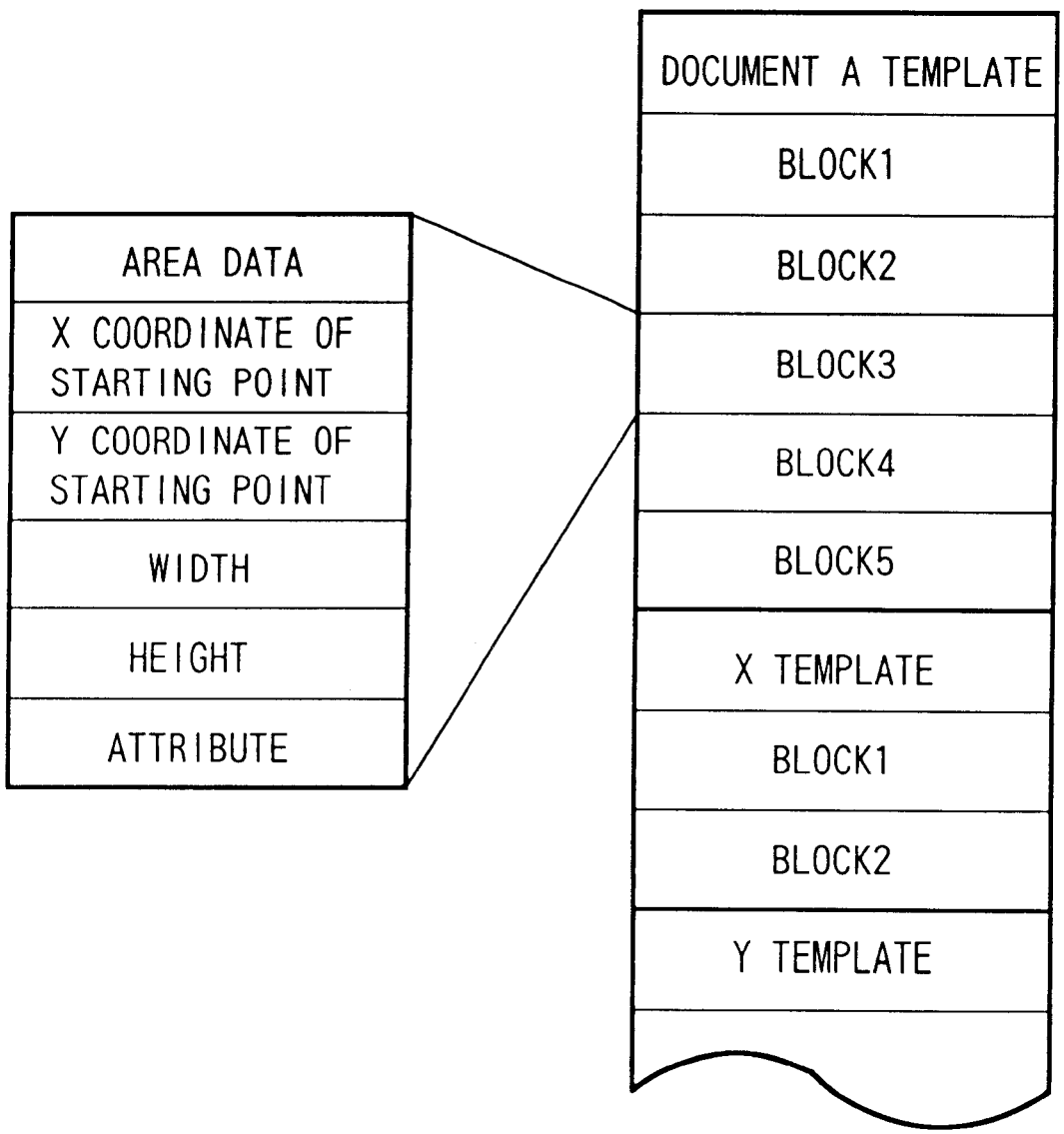
FIG. 8 is a diagram illustrating the manner in which a "Document A Template" is registered in the template data.

FIG. 8 is a diagram illustrating the manner in which a "Document A Template" is registered in the template data. Since the areas indicated by the rectangular frames 501–505 have been set on the image of document A in the manner shown in FIG. 5, five blocks are registered in the document A template. Which rectangular frame corresponds to which block of the blocks 1–5 may be decided, by way of example, in accordance with the order in which the rectangular frames were designated at step S202.

Processing for extracting desired areas from a newly read image using a template registered in the manner described above will now be explained with reference to the flowchart of FIG. 3.

First, a template necessary to extract desired areas is selected at step S301. In this embodiment, the template names of templates registered as shown in FIG. 7 are displayed on the display 108 and the operator is allowed to select the desired template using the mouse 103. Next, at step S302, a document to undergo processing is read by the scanner 101 and converted to binary image data in order that the area partitioning processing, described later, may be executed. This example will be described on the assumption that the document A template set at shown in FIG. 5 has been selected and that a document B, shown in FIG. 9, has been read in as the document to be processed.

This is followed by step S303, at which the input image obtained is subjected to area partitioning processing known to those skilled in the art, blocks are extracted and the attribute of each block is evaluated. FIG. 10 is a diagram showing an example of results obtained by executing area partitioning processing in regard to the document B. Each block of the blocks A–E is stored as extracted area information, with the data structure of the stored blocks being the same as that of the area information shown in FIGS. 6A, 6B. In other words, information representing the position, size and attribute of each extracted block is stored.

Next, at step S304, area data of blocks that have been extracted from document B are compared with the area data of blocks that have been saved in a selected template (the document A template). This is followed at step S305 by the extraction of a block whose area at least partially overlaps the area of a block in the template and has the same attribute as that of the area it overlaps. If such a block is extracted at step S305, then this block is deemed to be a block identical with the desired block and the image contained in the area of this block is output at step S306.

Figure 11:
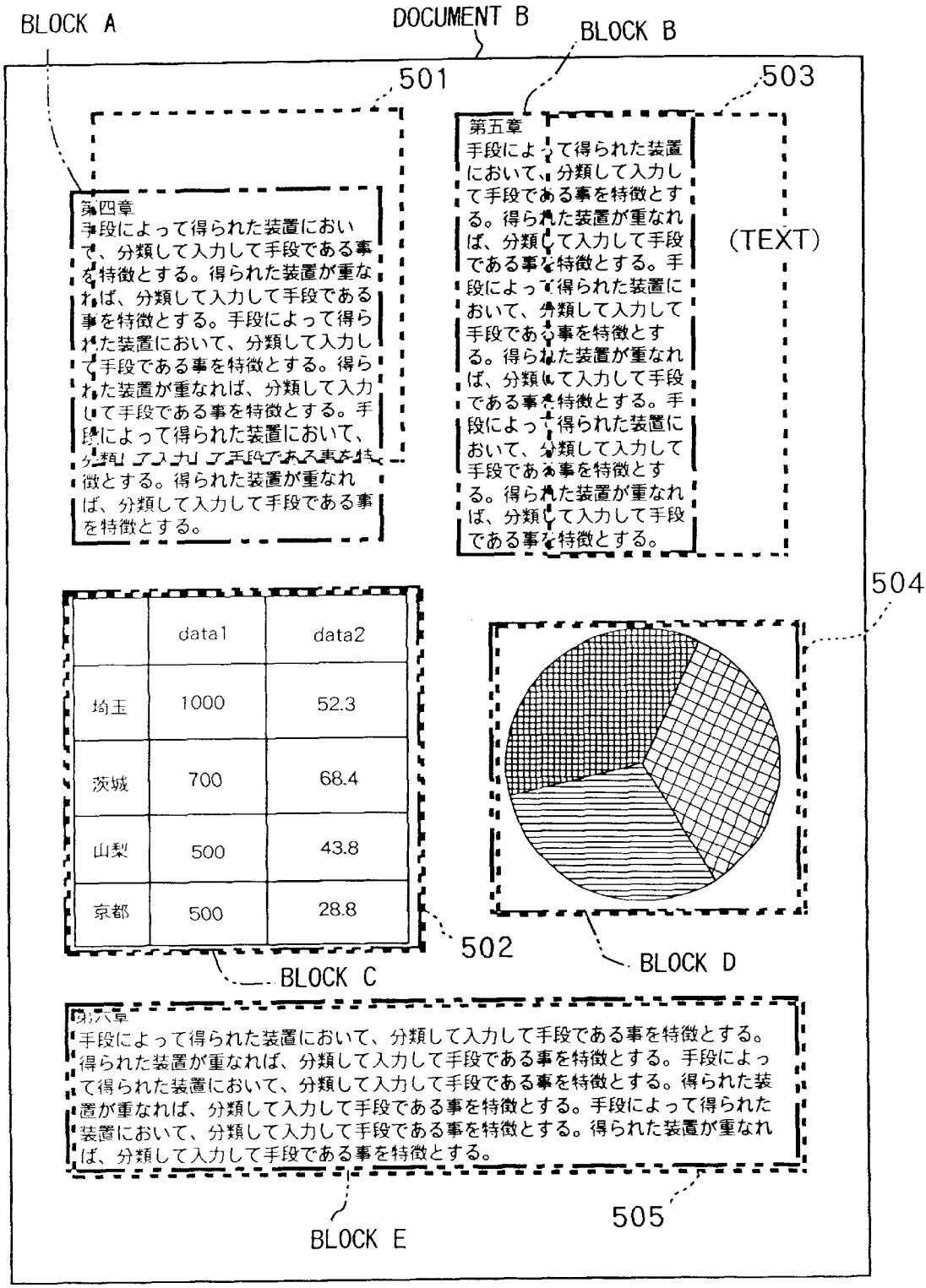
FIG. 11 is a diagram useful in describing the manner in which a template and the blocks of a document are compared.

FIG. 11 is a diagram useful in describing the manner in which a template and the blocks of a document are compared. Blocks that have been recorded as the document A template are indicated by dashed lines in FIG. 11, and blocks that have been extracted from the image of document B are indicated by broken lines. Though blocks A and B that have been extracted from document B are somewhat displaced from the block positions of the document A template, the blocks A and B have portions that overlap the block positions of the template. The attribute of both of these areas is "text". Blocks A and B, therefore, are extracted at step S305. The end result is that the area data of all blocks A–E of document B obtained in FIG. 10 is output.

Thus, in accordance with the first embodiment, as described above, even if the position and size of an area set in a template differ slightly from the position and size of an area to be extracted from a document image that has actually been read, a desired area can be extracted from the document image reliably.

At step S305 described above, a block extracted at least partially overlaps an area set in the template and has the same attribute as that of this area. However, whether or not a block is to be extracted may be decided upon taking into account the degree of overlap between the two blocks. For example, it may be so arranged that a block to be selected must overlap a block in the template by 70% or more and must have the same attribute. Furthermore, an arrangement may be adopted in which this ratio can be set for each block of the template.

[Second Embodiment]

According to the first embodiment described above, the setting of areas saved in a template is performed manually using the mouse 103. However, area setting processing for saving a template can be automated using area partitioning processing of the kind executed at step S303.

Figure 12:
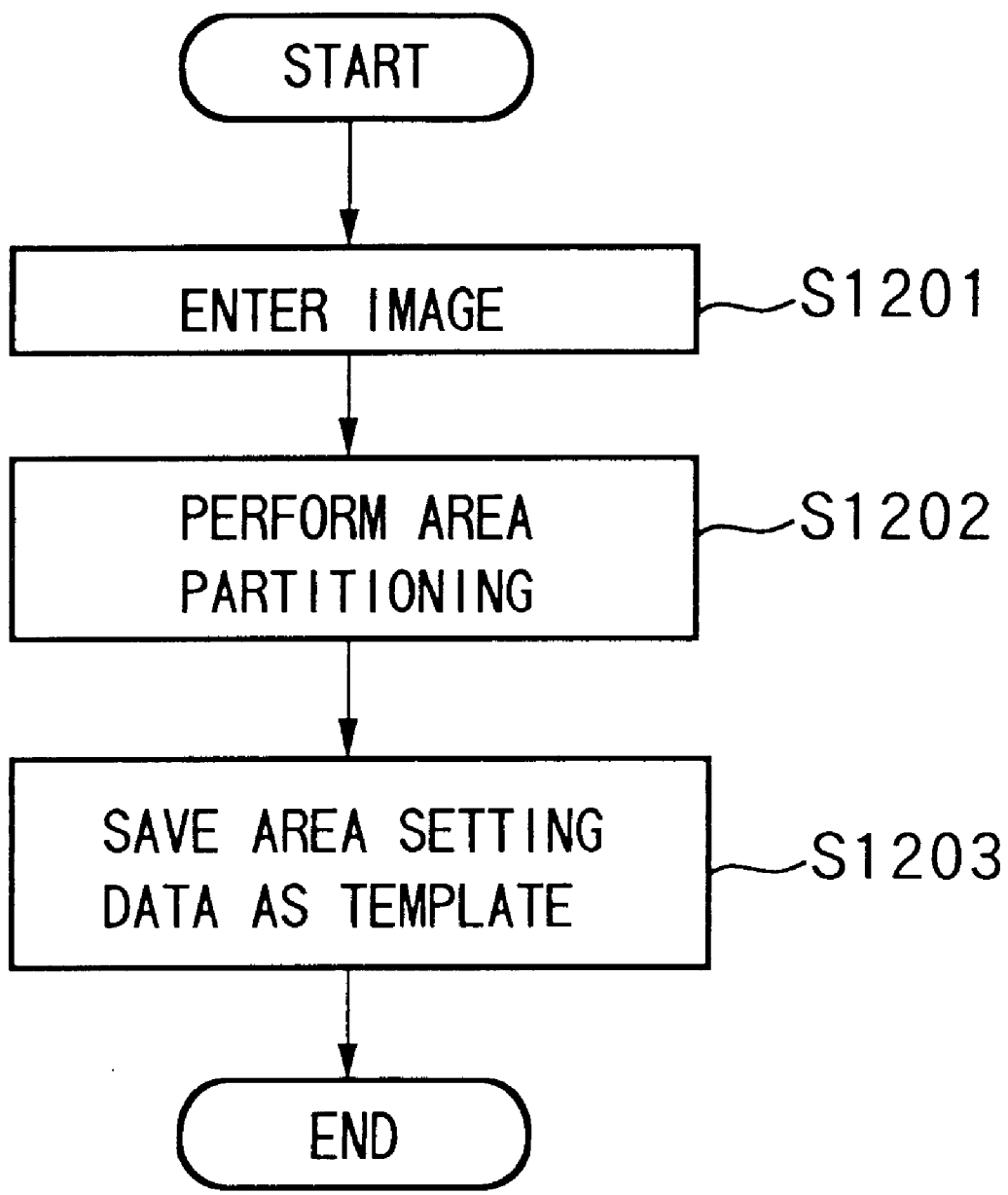
FIG. 12 is a flowchart illustrating the procedure of template save processing according to a second embodiment of the present invention.

The flow of such processing will be described in accordance with the flowchart of FIG. 12. FIG. 12 is a flowchart illustrating the procedure of template save processing according to the second embodiment of the present invention.

Figure 13:
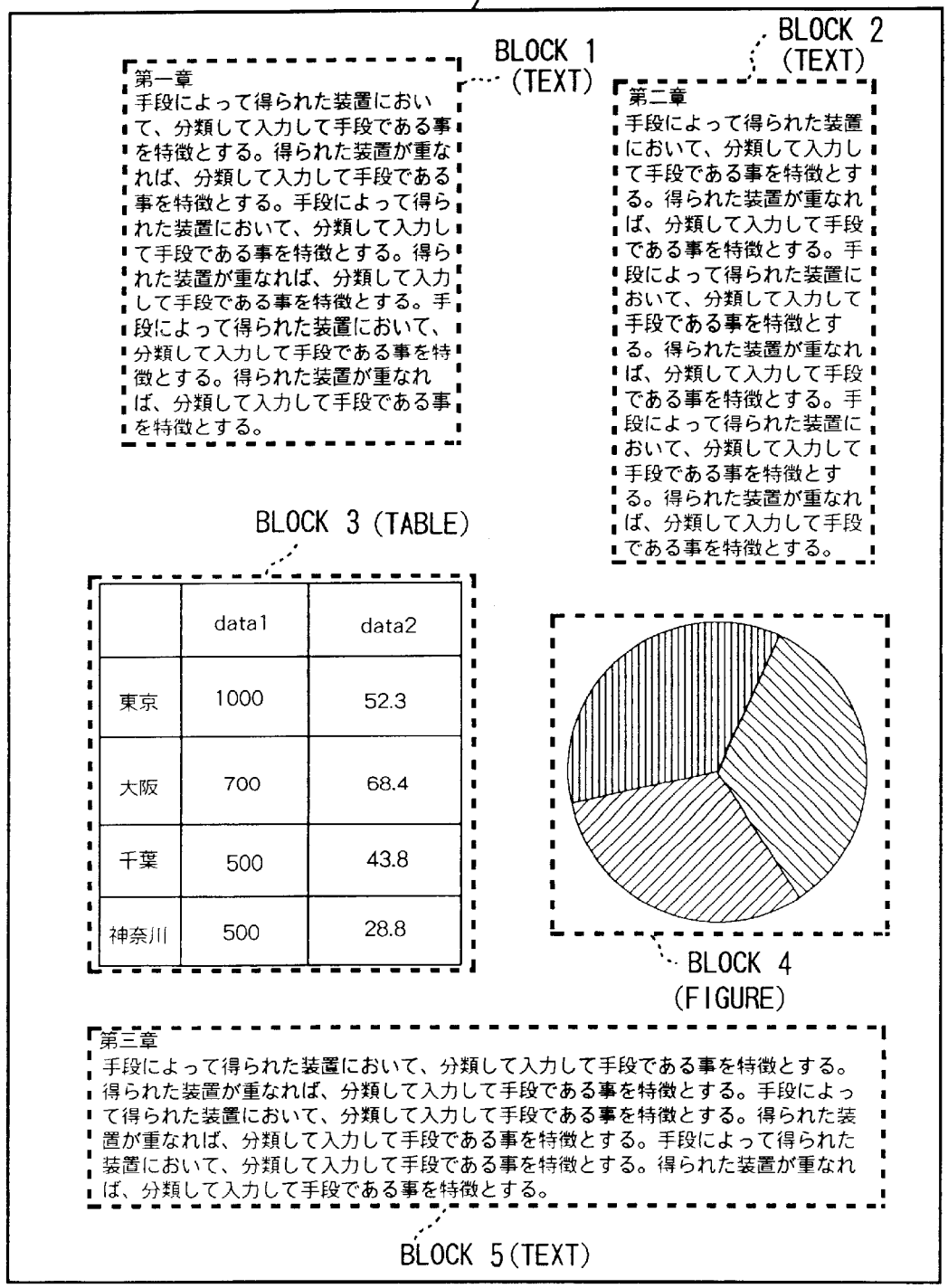
FIG. 13 is a diagram showing an example of results of area partitioning processing in this case.

The document A (see FIG. 4) having the format desired to be saved is read in and converted to binary image data, which is for area partitioning processing described below, by the scanner at step S1201. The input image obtained is then subjected to area partitioning processing at step S1202 to extract various areas (blocks) such as a text area, figure area, table area and title area. It should be noted that the area partitioning processing used at step S1202 may employ a technique will known to those skilled in the art. The result of this area partitioning processing is shown in FIG. 13. Each block is thus extracted and identification numbers corresponding to the various attributes as well as the position information are obtained as area partitioning data on a per-block basis. The structure of the area data regarding this document in this case can be assumed to be the same as that shown in FIG. 6. The area data of each of the extracted blocks is then registered and saved as the "Document A Template" in the manner illustrated in FIG. 8.

It should be noted that the processing for extracting areas from the image of an input document using the template registered as set forth above is as described earlier in conjunction with the flowchart of FIG. 3.

Thus, in accordance with the arrangement described above, a document to serve as a template need only be read by the scanner 101 to generate the template automatically. This enhances operability.

[Third Embodiment]

In the second embodiment, all areas extracted by area partitioning processing in template save processing are saved as a template. However, it can be so arranged that only a desired area among the extracted areas is selected and saved as a template. In the third embodiment, specific blocks among blocks extracted in area partitioning processing are designated by the mouse 3 and only the area partitioning data of these blocks are saved as a template.

Figure 14:
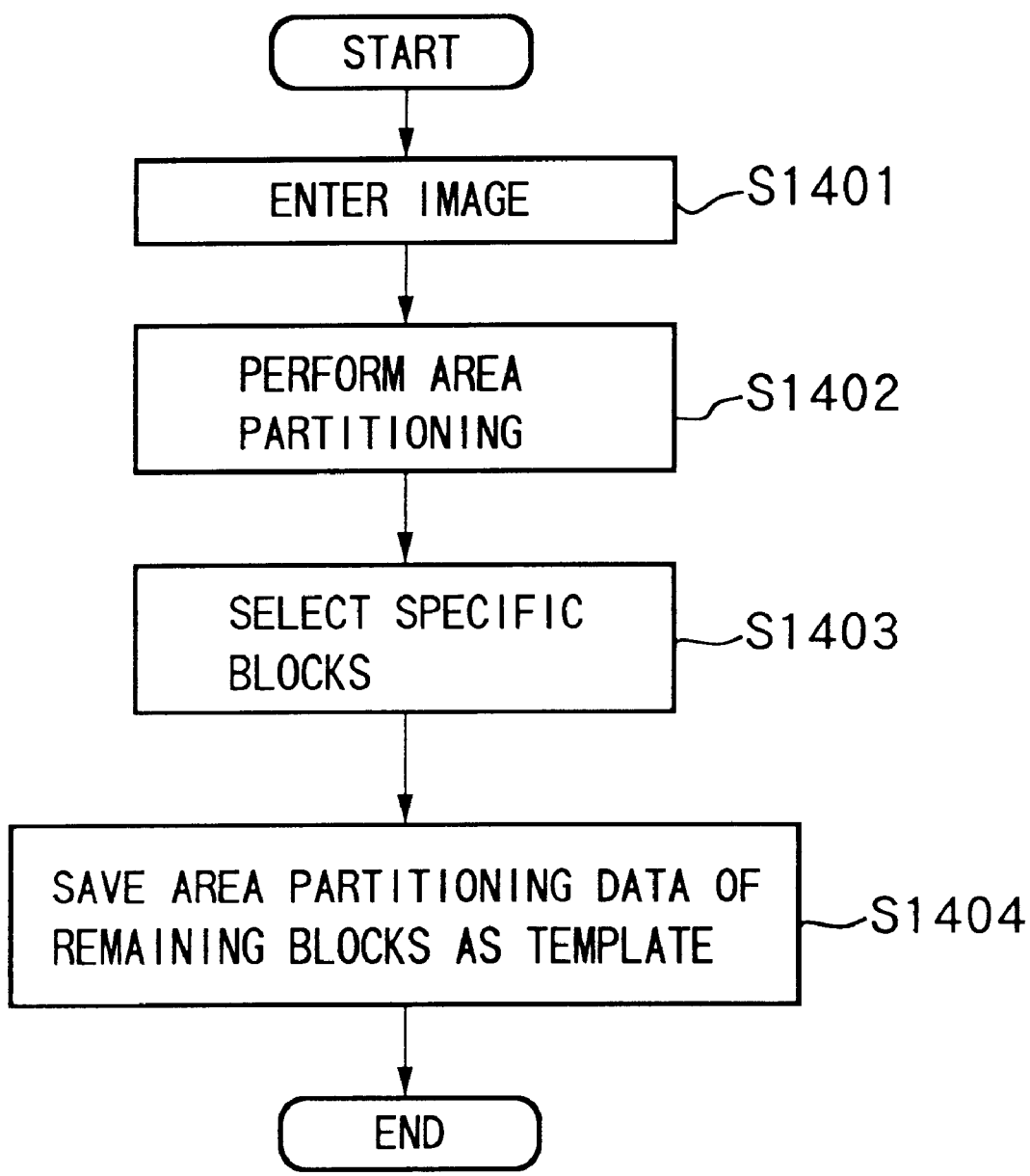
FIG. 14 is a flowchart illustrating the procedure of template save processing according to a third embodiment of the present invention.

FIG. 14 is a flowchart illustrating the procedure of processing for saving a template according to the third embodiment. The flow of processing of the third embodiment will now be described in accordance with the flowchart of FIG. 14.

The document A (see FIG. 4) having the format desired to be saved is read in and converted to binary image data by the scanner 101 at step S1401. The input image obtained is then subjected to area partitioning processing at step S1402 to extract various areas (blocks) such as a text area, figure area, table area and title area. The result of this extraction is as described above in connection with the second embodiment (FIG. 13). By way of example, area partitioning processing indicated at step S303 in FIG. 3 can be used as the area partitioning processing at step S1402.

Figure 15:
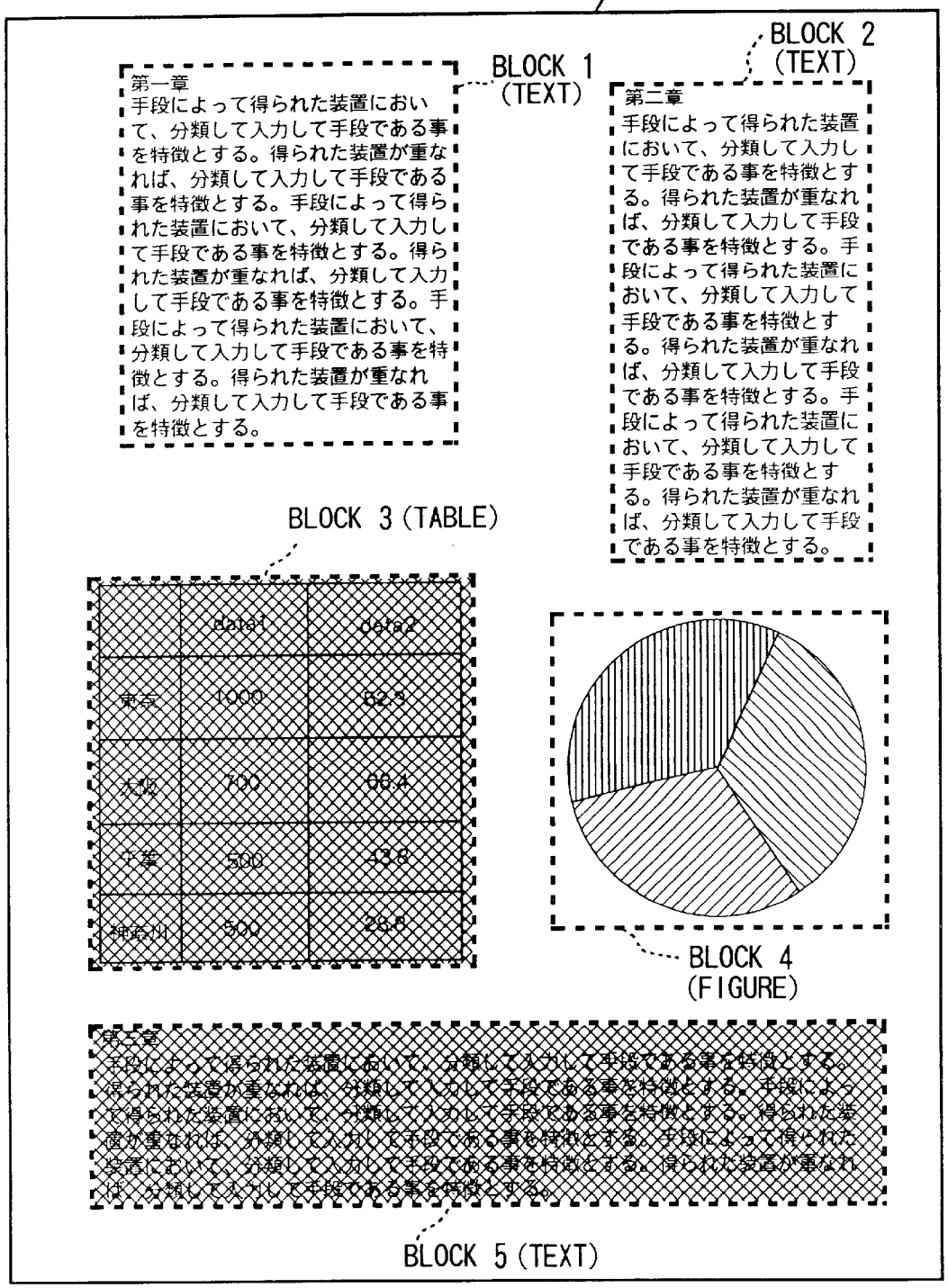
FIG. 15 is a diagram showing a state in which a block 3 and a block 5 have been selected in template save processing according to the third embodiment.

This is followed by step S1403, at which specific blocks are selected from the extracted blocks using the mouse 103. FIG. 15 is a diagram showing a state in which a block 3 and a block 5 have been selected. In the case of the example shown in FIG. 15, the selected blocks are indicated by hatching so as to be distinguished from other blocks.

Figure 16:
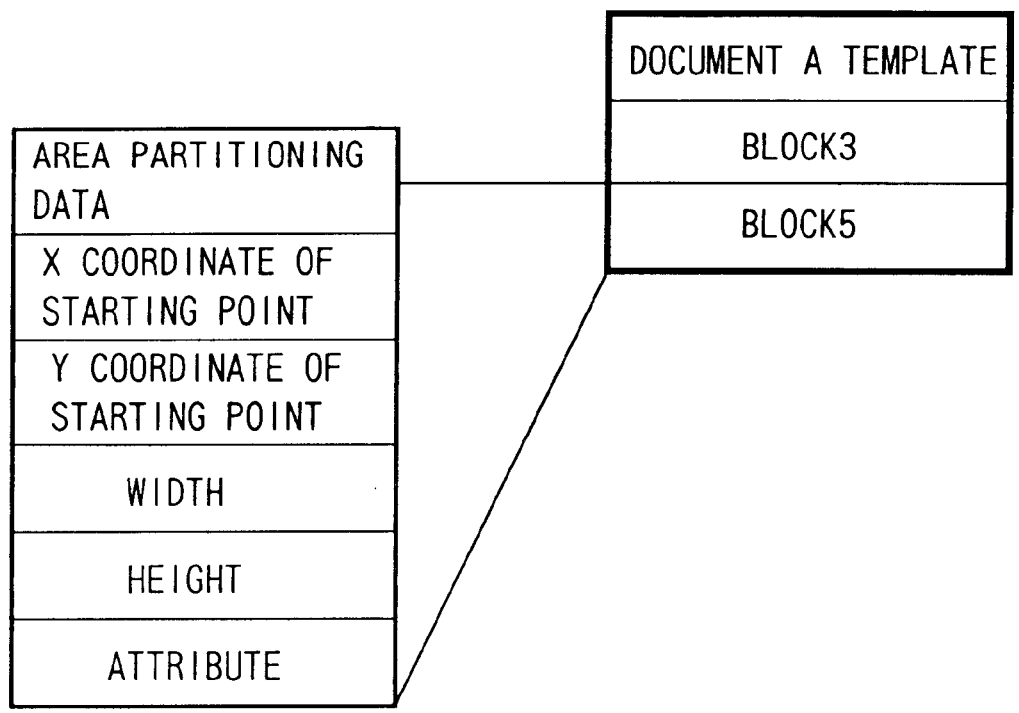
FIG. 16 is a diagram showing the data structure of the document A template in the third embodiment.

Next, at step S1404, only the area partitioning data (attributes and position information, etc.) of the blocks selected at step S1403 is saved as a template. In this example, only the area partitioning data of blocks 3 and 5 is saved as the document A template in the manner shown in FIG. 16.

Figure 17:
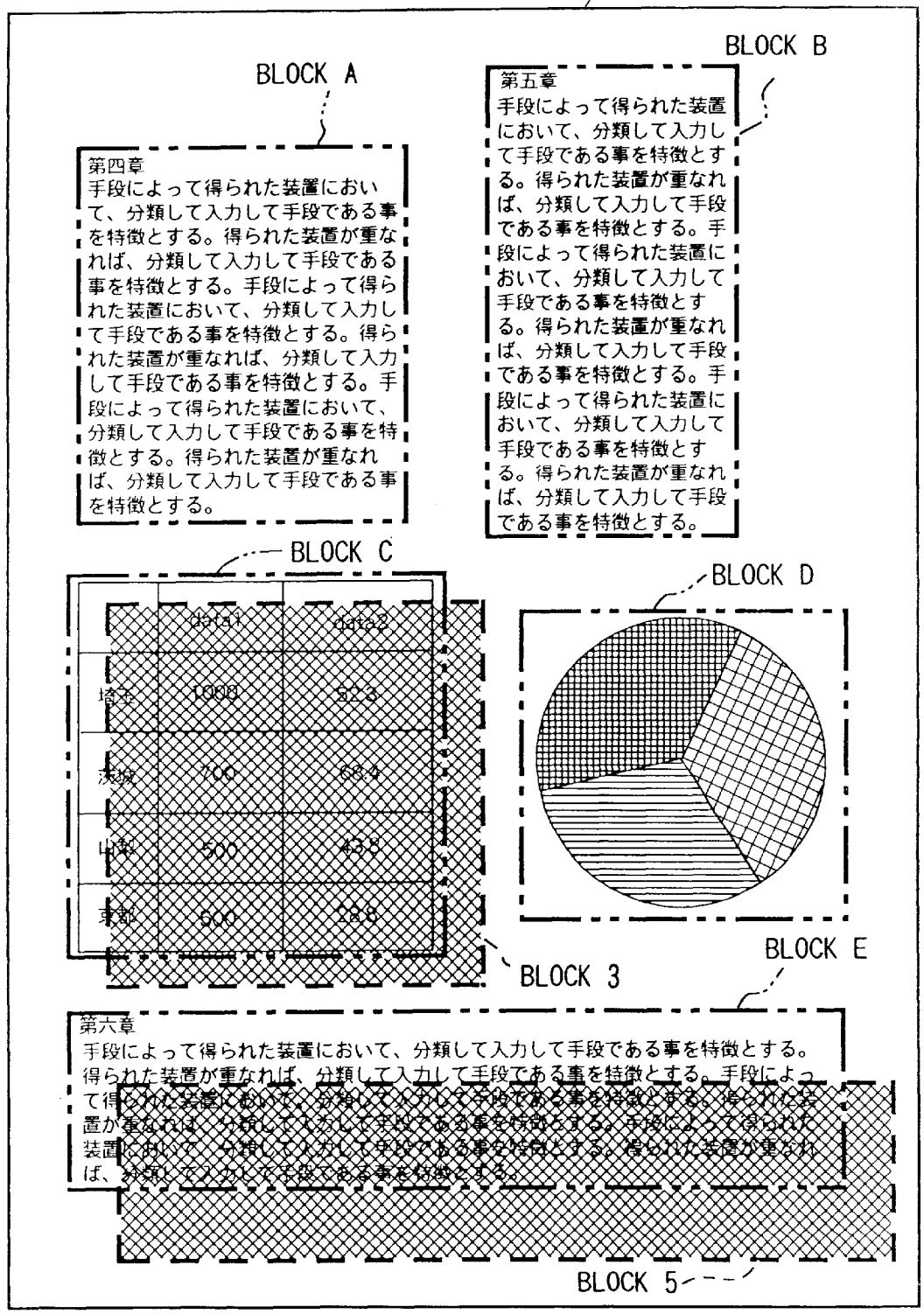
FIG. 17 is a diagram useful in describing results of comparing blocks in a case where a desired area is extracted from the document B using the document A template of FIG. 16.

A case where document B shown in FIG. 9 is processed using the document A template saved in the manner explained above will now be described. FIG. 17 is a diagram useful in describing results of comparing the template and each block of a document in a case where desired areas are extracted from the document B using the template composed solely of the blocks selected in FIG. 15. If the area extraction processing of FIG. 3 is executed in the case of this example, only the area partitioning data of blocks C and E is output. The blocks C and E among the blocks (indicated by the broken lines) of document B are judged to be areas that at least partially overlap the blocks (indicated by the dashed lines) recorded in the template and that have the same attributes as those of the template blocks.

Thus, in accordance with the third embodiment, as described above, desired areas can be selected from automatically extracted area data and the selected areas can be saved as a template.

[Fourth Embodiment]

In the third embodiment, areas to be saved as a template are designated by the operator. However, it goes without saying that areas that are not to be saved as a template may be designated by the operator. In the fourth embodiment, a desired area among blocks that have been extracted by area partitioning processing is designated by a mouse or the like and area data of blocks other than the designated block are saved as a template.

FIG. 18 is a flowchart for describing the procedure of processing for saving a template according to the fourth embodiment. The document A (see FIG. 4) having the format desired to be saved is read in and converted to binary image data by the scanner 101 at step S1801. The input image obtained is then subjected to area partitioning processing at step S1802 to extract various areas (blocks) such as a text area, figure area, table area and title area. This extraction operation provides results already described above in connection with the second embodiment (FIG. 13).

Next, at step S1803, desired blocks are selected from among the extracted blocks by using the mouse 103. For example, in FIG. 15 described above, blocks 3 and 5 are illustrated as being in the selected state. As shown in FIG. 15, the selected blocks are indicated by hatching so as to be distinguished from other blocks. Whereas these selected blocks were registered as a template in the third embodiment, the area data of these selected blocks is deleted in accordance with the fourth embodiment. Though the interior of a rectangular area of a selected and deleted block is hatched in the description given above, the method of representing a selected area is not limited to this expedient. For example, an arrangement may be adopted in which the frame border indicating the rectangle of the block is erased along with the deletion of the area data.

Next, at step S1804, only the area partitioning data (attributes and position information, etc.) of the blocks selected at step S1803 is saved as a template. In this example, only the area partitioning data of blocks 1, 2 and 4 is saved as the document A template as the result of the selections shown in FIG. 15.

The extraction of areas from an input document image using a template thus obtained is as already described above with reference to the flowchart of FIG. 3 in the first embodiment.

[Fifth Embodiment]

In each of the foregoing embodiments, documents to be processed are placed in the scanner 101 and read in one by one. However, automatic extraction by template in a case where a large number of documents have been entered by the scanner 101 using an ADF (Automatic Document Feeder) also is possible. FIG. 19 is a flowchart for describing the procedure of area extraction processing according to a fifth embodiment of the present invention. The flow of processing will now be described in accordance with the flowchart of FIG. 19. It should be noted that the processing of steps S1901, S1903–S1907 is the same as that of steps S301–S306 in the first embodiment.

The method of template registration may employ the technique of any of the first through fourth embodiments described above.

A desired template to be used to extract desired areas is selected at step S1901. Next, it is determined at step S1902 whether there is a document to be input, i.e., whether there is a document in the ADF. If the decision rendered is "YES", control proceeds to step S1903, where the document is read by the scanner and converted to binary image data by the scanner 101. If the decision at step S1902 is "NO", however, then this processing is terminated.

Next, the input image obtained is subjected to area partitioning processing at step S1904 to extract blocks. For example, if document B shown in FIG. 9 was read in at step S1903, then results of the kind shown in FIG. 10 are obtained by the area partitioning processing executed at step S1904.

Next, at step S1905, area data of a blocks that have been extracted by the area partitioning processing of step S1904 are compared with area data of blocks that have been saved in the template elected at step S1901. This is followed by step S1906, namely by the extraction of a block whose area at least partially overlaps the area of a block in the template and has the same attribute as that of the area it overlaps. Here the extracted block is construed to be a block identical with the desired block defined in the template and the area partitioning data of this block is output (step S1907).

For example, if the document A template obtained based upon document A shown in FIG. 5 is selected and the document B shown in FIG. 9 is read in by the scanner 101 and processed, then areas overlap as shown in FIG. 11. (Blocks that have been recorded as the document A template are indicated by dashed lines, and blocks that have been extracted from the image of document B are indicated by broken lines.) Since the attributes of the blocks whose areas overlap each other are the same (see FIGS. 5 and 10), the data of the areas of all blocks in the document B obtained in FIG. 10 is output. Control then returns to step S1902 and processing continues.

Thus, in accordance with each of the embodiments as described above, the following advantages are obtained when desired areas are extracted from a document image by a template: (1) Operator intervention is reduced; (2) the accuracy of desired area extraction is improved; (3) large quantities of documents can be processed automatically; (4) operability is enhanced; and (5) overall processing time is shortened.

Though the block areas are set as rectangular areas in each of the foregoing embodiments, the areas may have any shape, such as circular or elliptical, as long as they are closed areas.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention as described above, it is possible to reliably extract desired areas from an entered document image while employing a template.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    holding means for holding template information including position, size and attribute in regard to one or a plurality of areas in a template;
    image input means for inputting a document image;
    partition means for partitioning the input document image into block areas and evaluating attributes of the partitioned block areas; and
    extraction means for extracting, from the partitioned block areas, a block area that at least partially overlaps an area indicated by the position and size included in the template information and whose attribute agrees with the attribute of the overlapped area included in the template information.

2. The apparatus according to claim 1, wherein said holding means holds a plurality of template information of a plurality of templates;
    said apparatus further comprising selecting means for selecting desired template information from the plurality of template information of the plurality of templates held by said holding means;
    wherein said extraction means extracts, from the partitioned block areas, a block area that at least partially overlaps an area indicated by the position and size included in the selected template information and whose attribute agrees with the attributes of the overlapped area included in the selected template information.

3. The apparatus according to claim 1, wherein said holding means includes:
    setting means for setting area and attributes of the areas with respect to the template; and
    registration means for registering, as template information, position, size and attribute of each area set by said setting means.

4. The apparatus according to claim 3, wherein said setting means includes:
    display means for displaying the template; and
    designation means for allowing a user to designate a desired area and attribute on the template displayed by said display means, and
    wherein said registration means registers, as template information, position and size of the area designated attribute.

5. The apparatus according to claim 3, wherein said setting means sets an area and attribute, which are to serve as template information, by extracting a block area and its attributes from the template.

6. The apparatus according to claim 1, wherein said holding means includes:
    area acquisition means for acquiring a plurality of areas and attribute of each area from the template;
    area selection means for selecting a desired area from the plurality of areas acquired by said area acquisition means; and
    registration means for registering, as template information, the selected area and its attribute selected by said area selection means.

7. The apparatus according to claim 1, wherein said holding means includes:
    area acquisition means for acquiring a plurality of areas and attribute of each area from the template;
    area selection means for selecting a desired area from the plurality of areas acquired by said area acquisition means; and
    registration means for registration, as template information, the area, as well as its attribute, that has not been selected by said area selection means.

8. The apparatus according to claim 1, wherein said extraction means extracts, from the partitioned block areas, a block area that overlaps, in excess of a predetermined ratio, an area indicated by the position and size included in the template information and whose attribute agrees with the attribute of the overlapped area included in the template information.

9. An image processing method comprising:
    a holding step of holding template information including position, size and attribute in regard to one or a plurality of areas in a template;
    an image input step of inputting a document image;
    a partition step of partitioning the input document image into block areas and evaluating attributes of the partitioned block areas; and
    an extraction step of extraction, from the partitioned block area, a block area that at lest partially overlaps an area indicated by the position and size included in the template information and whose attribute agrees with the attribute of the overlapped area included in the template information.

10. The method according to claim 9, wherein said holding step holds a plurality of template information of a plurality of templates;
    said method further comprising a selection step of selecting desired template information from the plurality of template information of the plurality of templates held at said holding step;
    wherein said extraction step extracts, from the partitioned block areas, a block area that at least partially overlaps an area indicated by the position and size included in the selected template information and whose attribute agrees with the attributes of the overlapped area included in the selected template information.

11. The method according to claim 9, wherein said holding step includes;
    a setting step of setting areas and attributes of the areas with respect to the template; and
    a registration step of registering, as template information, position, size and attribute of each area set at said setting step.

12. The method according to claim 11, wherein said setting step includes:
    a display step of displaying the template; and
    a designation step of allowing a user to designate a desired area and attribute on the template displayed at said display step, and
    wherein said registration step registers, as template information, position and size of the area designated at said designation step and the designated attribute.

13. The method according to claim 11, wherein said setting step sets an area and attribute, which are to serve as template information, by extracting a block area and its attributes template.

14. The method according to claim 9, wherein said holding step includes:
   an area acquisition step of acquiring a plurality of areas and attribute of each area from the template;
   an area selection step of selecting a desired area from the plurality of areas acquired at said area acquisition step; and
   a registration step of registering, as template information, the selected area and its attribute selected at said area selection step.

15. The method according to claim 9, wherein said holding step includes:
   area acquisition step of acquiring a plurality of areas and attribute of each area from the template;
   area selection step for selecting a desired area from the plurality of areas acquired by said area acquisition step; and
   registration step for registering, as template information, the area, as well as its attribute, that has not been selected at said area selection step.

16. The method according to claim 9, wherein said extraction step extracts, from the partitioned the block areas, a block area that overlaps, in excess of a predetermined ratio, an area indicated by the position and size included in the template information and whose attribute agrees with the attribute of the overlapped area included in the template information.

17. A storage medium storing a control program for causing a computer to extract areas from an input image, said control program comprising:
   code of a holding step of holding template information including position, size and attribute in regard to one or a plurality of areas in a template;
   code of an image input step of inputting a document image;
   code of a partition step of partitioning the input document image into block areas and evaluating attributes of the partitioned block areas; and
   code of an extraction step of extracting, from the partitioned block areas, a block area that at least partially overlaps an area indicated by the position and size included in the template information and whose attribute agrees with the attribute of the overlapped area included in the template information.

* * * * *

UNITED STATES PATENT AND TRADEMARK OFFICE
CERTIFICATE OF CORRECTION

PATENT NO.    : 6,411,731 B1
DATED         : June 25, 2002
INVENTOR(S)   : Kazuyuki Saito It is certified that error appears in the above-identified patent and that said Letters Patent is hereby corrected as shown below:

Column 5,
Line 58, "will" should read -- well --.

Column 10,
Line 33, "lest" should read -- least --.

Column 11,
Line 27, "the" (second occurrence) should be deleted.

Signed and Sealed this

Twenty-first Day of January, 2003

JAMES E. ROGAN
*Director of the United States Patent and Trademark Office*